United States Patent
Ohta

(10) Patent No.: US 6,438,490 B2
(45) Date of Patent: *Aug. 20, 2002

(54) ROUTE SEARCHING DEVICE

(75) Inventor: Kazutaka Ohta, Yamato (JP)

(73) Assignee: Xanavi Informatics Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,606

(22) Filed: Apr. 27, 1999

(30) Foreign Application Priority Data

Apr. 28, 1998 (JP) .......................................... 10-118935

(51) Int. Cl.[7] ............................................... G01C 21/34
(52) U.S. Cl. ...................... 701/210; 701/209; 701/202; 340/990; 340/995
(58) Field of Search ................................ 701/200, 202, 701/209, 210, 211, 117; 73/178 R; 340/988, 990, 994, 995

(56) References Cited

U.S. PATENT DOCUMENTS

| | | | | |
|---|---|---|---|---|
| 5,272,638 A | * | 12/1993 | Martin et al. | 701/202 |
| 5,369,588 A | * | 11/1994 | Hayami et al. | 701/209 |
| 5,371,678 A | * | 12/1994 | Nomura | 701/117 |
| 5,406,490 A | * | 4/1995 | Braegas | 701/210 |
| 5,428,545 A | * | 6/1995 | Maegawa et al. | 701/210 |
| 5,568,390 A | * | 10/1996 | Hirota et al. | 340/990 |
| 5,694,122 A | | 12/1997 | Nakada | 340/990 |
| 5,774,827 A | * | 6/1998 | Smith, Jr. et al. | 701/202 |
| 5,845,227 A | * | 12/1998 | Peterson | 701/209 |
| 5,862,509 A | * | 1/1999 | Desai et al. | 701/210 |
| 5,892,463 A | * | 4/1999 | Hikita et al. | 701/209 |
| 5,911,773 A | * | 6/1999 | Mutsuga et al. | 701/210 |
| 5,919,246 A | * | 7/1999 | Waizmann et al. | 701/210 |

FOREIGN PATENT DOCUMENTS

| | | | |
|---|---|---|---|
| EP | 0 622 611 A1 | 11/1994 | ........... G01C/21/20 |
| EP | 660 289 A1 | 6/1995 | ......... G08G/1/0969 |
| JP | 08220246 | 8/1996 | |

* cited by examiner

Primary Examiner—Gary Chin
(74) Attorney, Agent, or Firm—Pennie & Edmonds LLP

(57) ABSTRACT

A processor calculates an estimated travel time required to travel from a current point to a destination or a passing point on a route on the basis of a travel time represented by traffic-jam information for a traffic-jam place which is represented by the traffic-jam information received by a traffic information receiver, and on the basis of a traffic-jam time calculated on the basis of map data for the other places; accordingly, the travel time required can be calculated in consideration of traffic-jam conditions.

5 Claims, 5 Drawing Sheets

ROUTE SEARCHING DEVICE

BACKGROUND OF THE INVENTION

1. Field of the Invention

The present invention relates to a technique for searching a recommendable route to a destination and calculating an estimated travel time needed for the route in a navigation apparatus installed in a vehicle, etc.

2. Description of Related Art

With respect to a navigation apparatus installed in a vehicle, there has been known a technique of searching a route extending from a departure place to a destination on the basis of road map data and suggesting the route thus searched as a recommendable route to a user.

Such a recommendable route searching operation is carried out by searching (selecting) a route needing the minimum cost in available routes between the departure place and the destination according to a technique called as "Dijkstra algorithm" or the like. In this method, the total distance of the route or the travel time needed for the route is usually selected as the "cost" defined in this method.

The estimated travel time needed for the route (hereinafter merely referred to as "estimated travel time") is calculated as follows. When a recommendable route is determined, the length of each of the roads constituting the recommendable route is weighted with the value corresponding to the type of each road (expressway, public road or the like) to set the value thus weighted as a travel time for each road, and the estimated travel time is calculated on the travel times for the roads.

Recently, there has been put into practice a traffic information communicating system for supplying traffic information to users of vehicles through communications, which is known as VICS (the trademark of the foundation of Traffic Information Communication System Center).

According to this traffic information communication system, traffic information such as traffic jams, traffic regulations, etc. is transmitted from the center to vehicles by optical beacons or electric wave beacons disposed on roads or by FM multi-broadcasting, thereby enabling real-time use of traffic information in the vehicles. In a conventional navigation apparatus, when traffic regulation information is received from such a traffic information communication system, the contents representing the traffic regulation information are notified to users in the form of characters, voices and displays of figures on a road map.

SUMMARY OF THE INVENTION

The above-described conventional technique for calculating an estimated travel time needed for a recommendable route has the following problem.

That is, the travel time needed for the recommendable route is calculated on the basis of fixed parameters such as the length of each road, the type of each road, etc., and thus when some roads of the recommendable route suffer from traffic jam for traffic regulation such as one-way traffic or the like, the estimated travel time thus calculated differs greatly from actual travel time.

Therefore, an object of the present invention is to calculate an estimated travel time for a recommendable route, which more meets an actual traffic condition.

In order to attain the above object, a route searching apparatus for searching a recommendable route to a destination includes: means for storing map data representing road maps; means for receiving traffic jam information representing traffic jam places and a travel time needed to pass through a section in which each of the traffic jam places is located by communication; and travel time calculating means for setting the travel time represented by the traffic jam information as an effective travel time for the traffic jam section represented by the traffic jam information thus received while setting a travel time calculated on the basis of the map data as an effective travel time for the other sections, calculating the sum of effective travel times for respective sections located between the current position on the searched recommendable road and a destination or a point on the recommendable route for which an estimated travel time is calculated, and displaying the sum of the effective travel times thus calculated as the travel time needed to travel from the current position to the destination or the point on the recommendable road for which the estimated travel time is calculated.

According to the above route searching apparatus, traffic jam information is picked up from a traffic information communication system such as VICS or the like and the estimated travel time is calculated in consideration of the traffic jam information. Therefore, even when a traffic jam occurs or traffic regulation is carried out, an estimated travel time conforming to the actual traffic conditions can be calculated.

DETAILED DESCRIPTION OF THE PREFERRED EMBODIMENT

A preferred embodiment of a route searching apparatus according to the present invention will be described using a case where the present invention is applied to a vehicle-mount type navigation apparatus.

Figure 1:
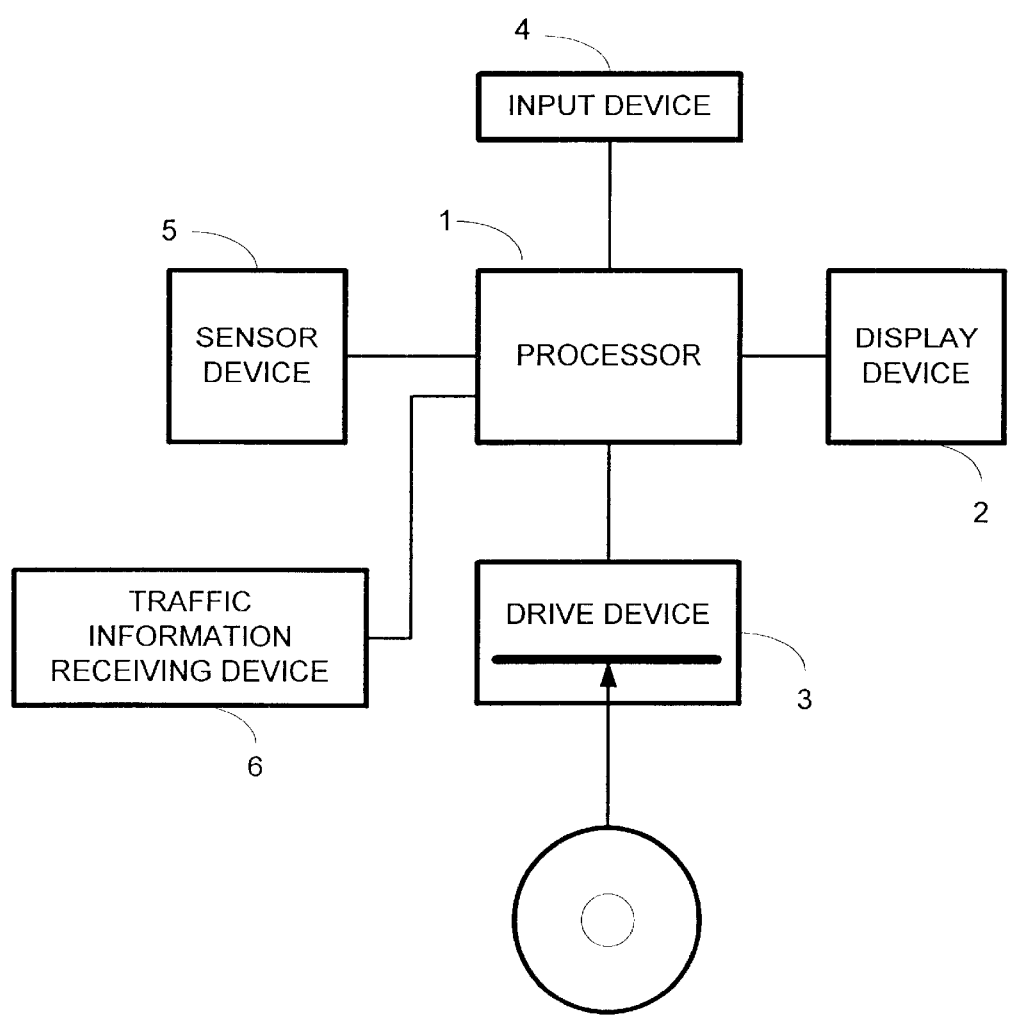
FIG. 1 is a block diagram showing the constitution of a navigation apparatus according to an embodiment of the present invention.

FIG. 1 shows the construction of a navigation apparatus according to an embodiment of the present invention.

In FIG. 1, reference numeral 1 represents a processor comprising a microprocessor and a memory, reference numeral 2 represents a display device, reference numeral 3 represents a drive device for accessing a storage medium such as CD-ROM or the like in which map data are stored, reference numeral 4 represents an input device for accepting an instruction input of a user, reference numeral 5 represents a sensor device comprising a vehicle-speed sensor, an azimuth sensor, a GPS receiver, etc., and reference numeral 6 represents a traffic information receiving device for receiving traffic information from a traffic information communication system such as VICS or the like as described above.

Here, map data is recorded in a storage medium such as CD-ROM or the like to be loaded in the drive device 3 will be described.

Figure 2:
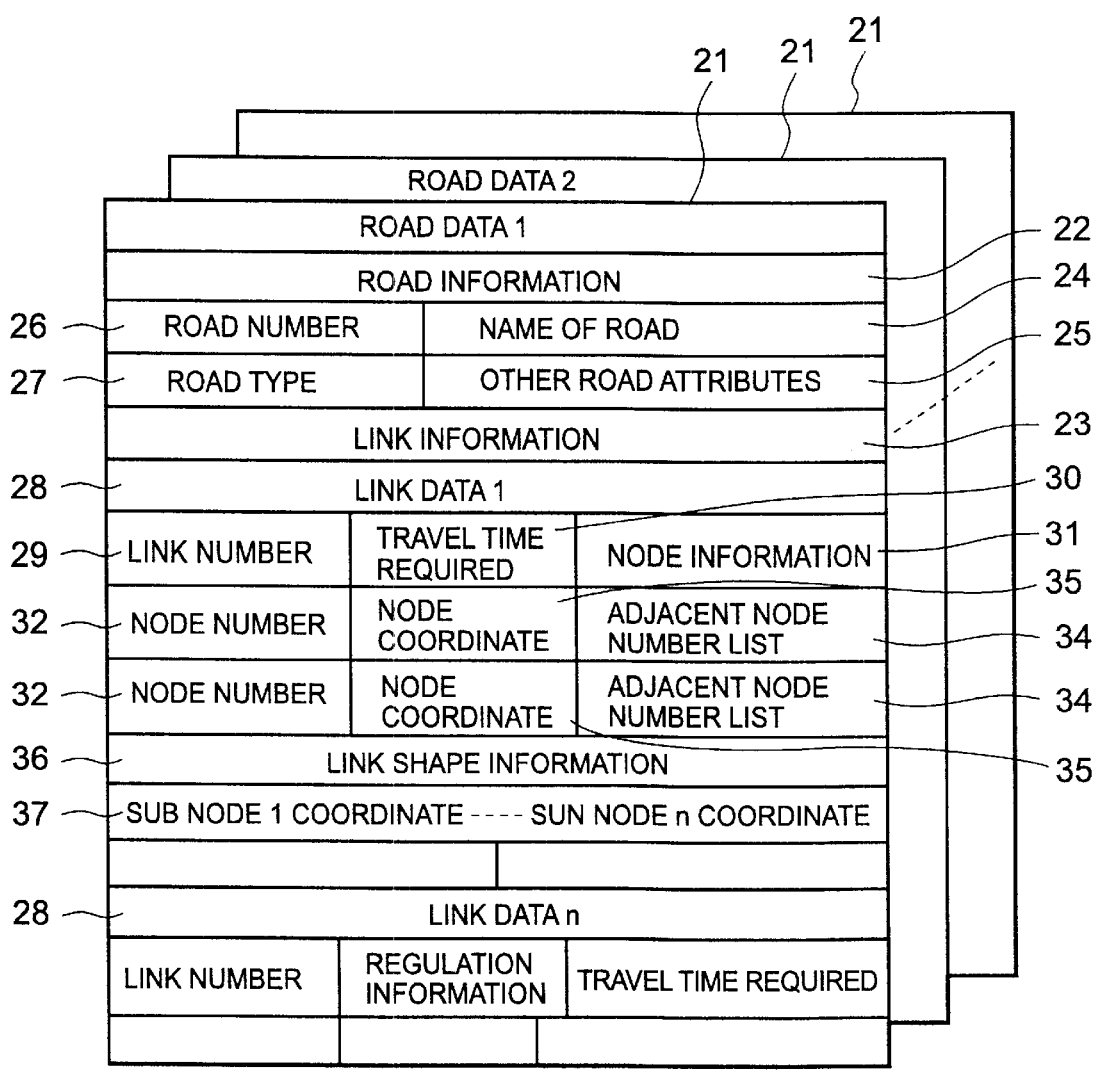
FIG. 2 is a diagram showing the constitution of map data according to the embodiment of the present invention.

As shown in FIG. 2, the map data comprises road data 21 provided for each road, and the road data 21 comprises road information 22 and link information 23.

The road information 22 contains a road number 26 representing a road uniquely, a road name 24 representing the name of a road, a road type 27 representing the type of road (toll road, national highway, prefectural highway), and other attributes 25 representing other information for the road.

The link information 23 contains link data 28 representing information of links provided for every link constituting a road. Here, "link" is a line segment used for approximating the shape and position of a road. The link data 28 contains a link number 29 representing a link uniquely and a time required 30 corresponding to a value proportional to the length of the link.

Further, the link data 28 contains node information 31 which is information of a link to be next described, for example, information representing that the node is an interchange or service area of an expressway, an intersection or the like.

Further, the link data 28 contains, for two nodes at both sides of a link, a node number 32 representing a node uniquely, a node coordinate 35 representing the position of the node, and an adjacent node number list 34 in which the node numbers of all the nodes linked to the node concerned through links are listed. Here, the linkage between links is necessarily performed through a node. At a crossroads, a node is located at the center of the crossroads, and four links are linked to the node at the center. In this case, the adjacent node number list 34 of the node at the center contains the description of the node numbers of four nodes at the other ends of the four links which are linked to the node concerned.

The link data 28 contains link shape information 36 specifying the shape of a link. The link shape information 36 comprises one or plural sub node coordinates 37. When the number of the sub node coordinates 37 is equal to two, the shape of the link is specified as a shape obtained by successively and linearly connecting a first node coordinate of the link, a first sub node coordinate, a second sub node coordinate and a second node coordinate of the link in this order.

With the above constitution, the processor 1 calculates the current position of the vehicle by referring to a vehicle travel azimuth input from the azimuth sensor of the sensor device 5, a vehicle speed input from the vehicle-speed sensor of the sensor device 5 and mesh map data to which the measured current position input from the GPS receiver of the sensor device 5 belongs, and calculates an estimated route from the current position to the destination on the basis of a destination input through the input device 4 by a user and the current position input through the input device 4 by the user or calculated from the input from the sensor device 5.

The processor 1 controls the drive device 3 to read out the map data on the basis of the current position thus calculated, the travel azimuth of the vehicle and the content indicated through the input device 5 by the user, and displays a map represented by the map data on the display device 2. The map display is carried out by displaying a map of an area around the calculated current position on a predetermined reduced scale, displaying a map of a district indicated by the user on a predetermined or indicated reduced scale, or displaying a map covering a region from the current position to the destination in a proper reduced scale together with a searched recommendable route. At this time, marks representing the current position and the travel azimuth of the vehicle are displayed on the map while overlaid on the map.

The estimated travel time calculation processing executed by the processor 1 will be described below.

Figure 3:
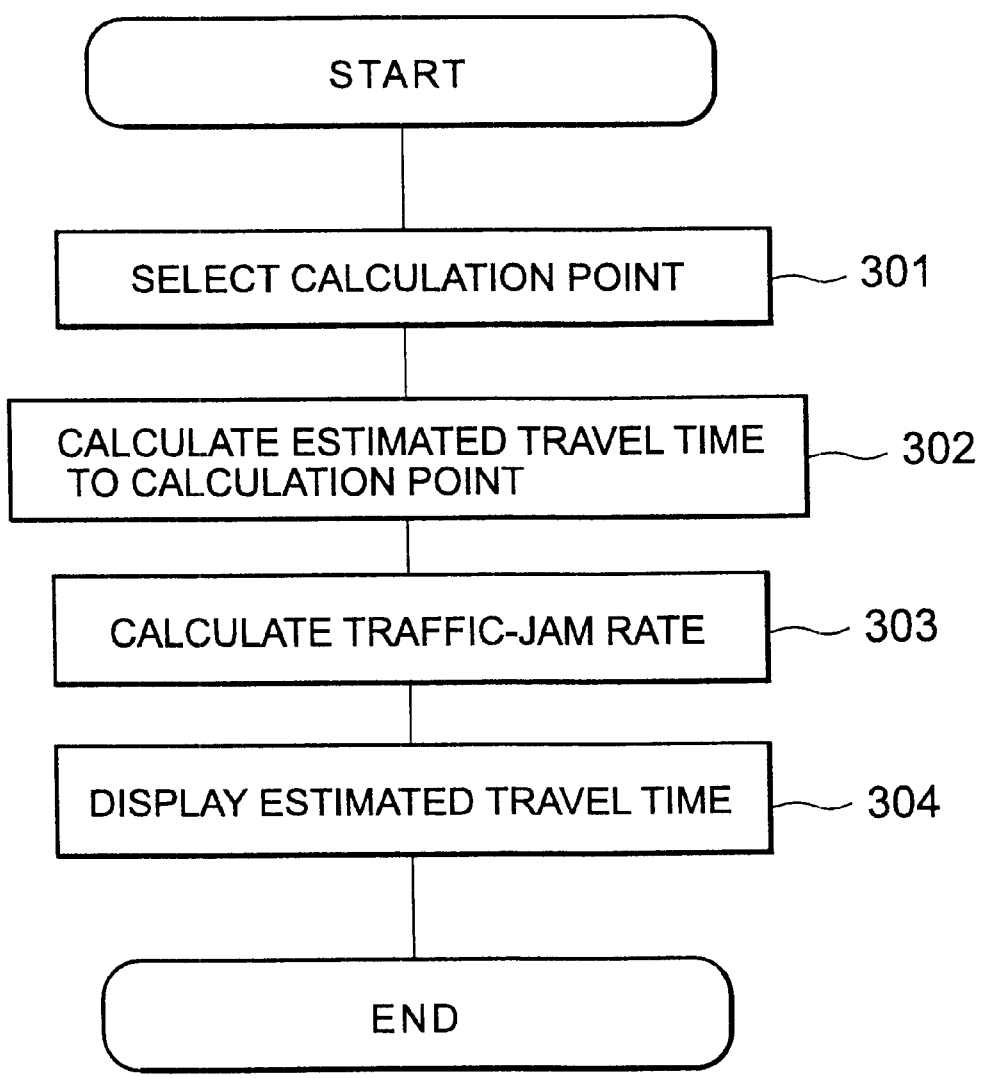
FIG. 3 is a flowchart showing the operation of the navigation apparatus according to the embodiment of the present invention.

FIG. 3 is a flowchart showing the estimated travel time calculation processing.

In this processing, the link data 28 of links on a searched recommendable route are checked to select calculation points used to calculate the estimated travel time. As the calculation points, there are selected the destination, and nodes which are described in node information 31 as intersections, interchanges and service areas, or which serve as transfer points between different roads on the recommendable route, among nodes located in a predetermined range from the current position to a position on moving direction (step 301).

Next, the estimated travel time required to travel to each calculation point is calculated (step 302).

The calculation of the estimated travel time required is performed as follows.

That is, for each link on the recommendable road between the current position and the destination, the travel time 30 of the link data of each link is weighted with a value corresponding to the road type 27 of the road information of the road data 21 to which the link data 28 concerned belongs, thereby obtaining the static travel time required. At the same time, the link length of each link is calculated on the basis of the link data 28.

Subsequently, a travel time required to travel between a traffic-jam starting point and a traffic-jam ending point which are represented by traffic-jam information received by the traffic information receiver 6 is taken. Here, the travel time represented by the traffic-jam information received by the traffic information receiver 6 represents the current travel time required between the traffic-jam starting point and the traffic-jam ending point which is actually measured. A dynamic travel time required for each link is calculated from the static travel time required for the link by the following equation:

$$\text{Dynamic travel time} = M - (M \times Y/X) + N$$

Figure 4:
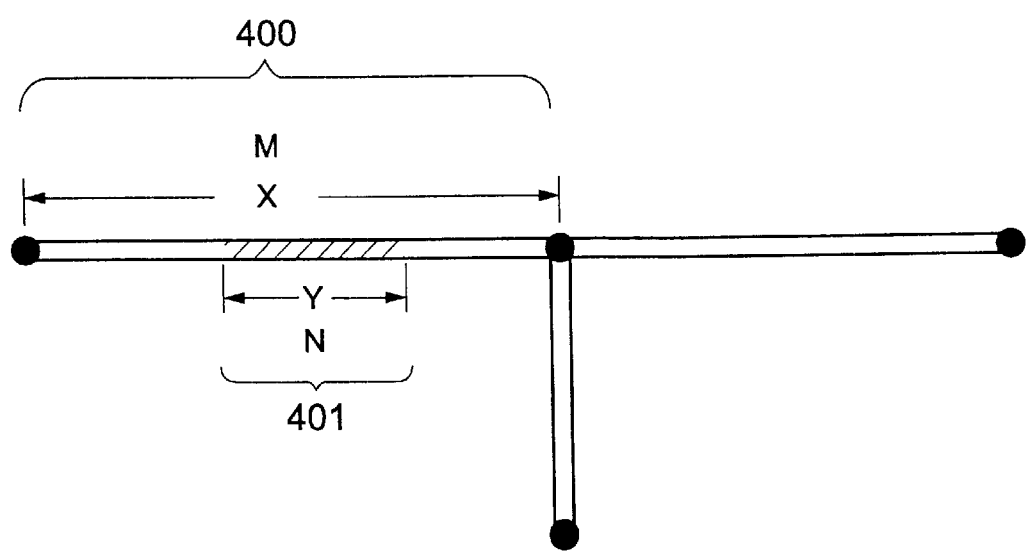
FIG. 4 is a diagram showing how a dynamic travel time is calculated according to the embodiment of the present invention.

Here, as shown in FIG. 4, X represents the link length of a link 400, M represents a static travel time calculated for the link 400, Y represents the length of a part 401 contained in the link 400 of a section between the traffic-jam starting point and the traffic-jam ending point, and N represents a travel time of the part 401 which is calculated on the basis of the travel time received by the traffic information receiver 6.

If the value of the dynamic travel time calculated by the above equation is larger than the static travel time by a predetermined rate or more (two times or more), it is estimated that the reception content of the traffic information receiver 6 may contain an error, and thus the static travel time is directly used as the dynamic travel time.

Subsequently, for each calculation point, the sum of the dynamic travel times calculated for the respective links between the current position and the calculation point is calculated, and it is set as an estimated travel time required to travel from the current point to the calculation point concerned. Further, the total link length calculated from the respective links between the current point and the calculation point is set as a travel distance from the current point to the calculation point (step 303).

Subsequently, the sum of the static travel time required for the respective links from the current position to the destination is subtracted from the estimated travel time calculated, and the ratio of the subtraction result to the estimated travel time is calculated as a traffic-jam rate (step 304).

Figure 5:
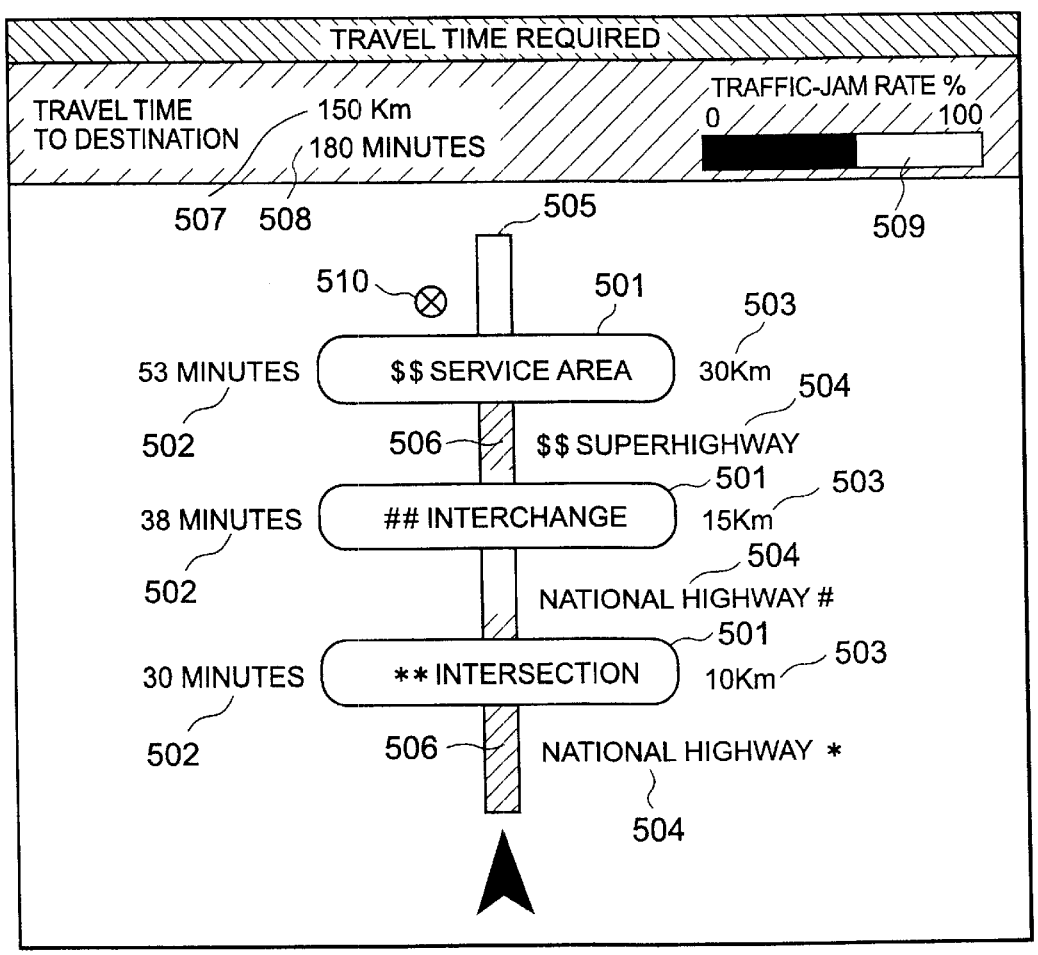
FIG. 5 is a diagram showing an example of a display according to the embodiment of the present invention.

The travel time required to travel to each calculation point is displayed together with the travel distance to the calculation point concerned as shown in FIG. 5, for example.

In FIG. 5, the estimated travel time 502 and the travel distance 503 to each calculation point are displayed at both the right and left sides of the name 501 of each of the interchanges, intersections and services represented by the node information 31 of nodes (excluding the destination) selected as calculation points. A road between calculation points is displayed as a line segment 505 connecting the names of the nodes, and the name 504 of the road is displayed on its side. A line segment 506 approximately representing a traffic-jam section specified by a traffic-jam starting point and a traffic-jam ending point, the information of which is received by the traffic information receiver, is displayed with every different color on the line segment 505. A mark 510 representing a regulation content represented by regulation information received by the traffic information receiver 6 is displayed in the neighborhood of a regulated place. Further, the estimated travel time 507 and the travel distance 509 to the destination and a bar graph showing the traffic-jam rate are displayed at the upper side.

In the calculation of the dynamic travel time described above, the static travel time is directly used as the dynamic travel time when the dynamic travel time is larger than the static travel time by a predetermined rate or more. On the basis of regulation information received by the traffic information receiver 6, the predetermined rate for the dynamic travel time of a traffic-jam section containing a traffic-jam place which is estimated to be caused by a traffic regulation may be set to a value larger than that in the other cases. This is because when a traffic jam is caused by a traffic regulation, the dynamic travel time may be large irrespective of a reception error of the traffic information receiver 6.

As described above, according to this embodiment, the estimated travel time is calculated in consideration of the traffic-jam and traffic regulation information taken from the traffic information communication system. Therefore, even when a traffic jam occurs or traffic regulation is carried out, an estimated travel time conforming more to actual traffic conditions can be calculated.

In this embodiment, the processor 1 may be a computer having a CPU, a memory and a proper OS. In this case, each process executed by the processor 1 is implemented by the CPU executing a program in which the procedure of each process is described. In this case, these programs may be supplied to the processor 1 through a storage medium such as a CD-ROM or the like.

As described above, according to the present invention, an estimated travel time conforming more to actual traffic conditions can be calculated.

What is claimed is:

1. An apparatus for estimating a travel time needed to travel from a current position to a destination or a point on a recommendable route, comprising:

storing means for storing map data representing a road map, said map data comprising link data pieces, each of which represents a link between nodes on a road on the road map and has a travel estimation time of the link;

receiving means for receiving traffic jam information representing a traffic jam place and a travel estimation time of the traffic jam place by communication;

travel time estimating means for estimating a travel time needed to travel from the current position to the destination or the point on the recommendable route; and display means for displaying the estimated travel time;

wherein said travel time estimating means obtains link data pieces representing a route from the current position to the destination or the point on the recommendable route, obtains a traffic jam travel estimation time needed to pass through a section where traffic jam place is located on the route represented by said link data pieces thus obtained, obtains a non-traffic jam travel estimation time needed to pass through a section where traffic jam place is not located on the route represented by said link data pieces thus obtained, and calculates the sum of the traffic jam travel estimation time and the non-traffic jam travel estimation time as the travel time needed to travel from the current position to the destination or the point on the recommendable route, and wherein the non-traffic jam travel estimation time is obtained in such a manner that, as to each of the link data pieces thus obtained, a ratio of a length of a section where traffic jam place is located on a link represented by the link data piece to a length of the link is calculated, a first intermediate time obtained by multiplying a travel time of the link data piece by the ratio is calculated, a second intermediate time obtained by subtracting the first intermediate time from the travel time of the link data piece is calculated, and the sum of the second intermediate times of the link data pieces thus obtained is calculated as the non-traffic jam travel estimation time.

2. The apparatus as claimed in claim 1, wherein said travel time estimating means calculates a traffic jam rate of the traffic jam travel estimation time to the estimated travel time needed to travel from the current position to the destination or the point on the recommendable route, and said display means displays the traffic jam with the estimated travel time needed to travel from the current position to the destination or the point on the recommendable route.

3. The apparatus as claimed in claim 1, wherein said link data piece has a road type, and the second intermediate time is obtained by subtracting the first intermediate time from the travel time of the link data piece and then multiplying the subtraction result by a weight according to a road type of the link data piece.

4. A method for estimating a travel time needed to travel from a current position to a destination or a point on a recommendable route, comprising steps of:

storing map data representing a road map, said map data comprising link data pieces, each of which represents a link between nodes on a road on the road map and has a travel estimation time of the link;

receiving traffic jam information representing a traffic jam place and a travel estimation time of the traffic jam place by communication;

obtaining link data pieces representing a route from the current position to the destination or the point on the recommendable route;

obtaining a traffic jam travel estimation time needed to pass through a section where traffic jam place is located on the route represented by said link data pieces thus obtained;

obtaining a non-traffic jam travel estimation time needed to pass through a section where traffic jam place is not located on the route represented by said link data pieces thus obtained;

calculating the sum of the traffic jam travel estimation time and the non-traffic jam travel estimation time to obtain the travel time needed to travel from the current position to the destination or the point on the recommendable route; and displaying the calculated travel time;

wherein the non-traffic jam travel estimation time is obtained in such a manner that, as to each of the link data pieces thus obtained, a ratio of a length of a section where traffic jam place is located on a link represented by the link data piece to a length of the link is calculated, a first intermediate time obtained by multiplying a travel time of the link data piece by the ratio is calculated, a second intermediate time obtained by subtracting the first time from the travel time of the link data piece is calculated, and the sum of the second intermediate times of the link data pieces thus obtained is calculated as the non-traffic jam travel estimation time.

5. A medium for storing a program which is read out and executed by a computer, wherein said program makes said computer execute steps of:

storing map data representing a road map, said map data comprising link data pieces, each of which represents a link between nodes on a road on the road map and has a travel estimation time of the link;

receiving traffic jam information representing a traffic jam place and a travel estimation time of the traffic jam place by communication;

obtaining link data pieces representing a route from the current position to the destination or the point on the recommendable route;

obtaining a traffic jam travel estimation time needed to pass through a section where traffic jam place is located on the route represented by said link data pieces thus obtained;

obtaining a non-traffic jam travel estimation time needed to pass through a section where traffic jam place is not located on the route represented by said link data pieces thus obtained;

calculating the sum of the traffic jam travel estimation time and the non-traffic jam travel estimation time to obtain the travel time needed to travel from the current position to the destination or the point on the recommendable route; and displaying the calculated travel time;

wherein the non-traffic jam travel estimation time is obtained in such a manner that, as to each of the link data pieces thus obtained, a ratio of a length of a section where traffic jam place is located on a link represented by the link data piece to a length of the link is calculated, a first intermediate time obtained by multiplying a travel time of the link data piece by the ratio is calculated, a second intermediate time obtained by subtracting the first time from the travel time of the link data piece is calculated, and the sum of the second intermediate times of the link data pieces thus obtained is calculated as the non-traffic jam travel estimation time.

* * * * *